(12) United States Patent
Trad (10) Patent No.: US 12,509,302 B2
(45) Date of Patent: Dec. 30, 2025

(54) CONVEYOR FOR GRANULAR MATERIAL DRIVEN BY LINEAR INDUCTION MOTOR WITH DOUBLE-SIDED PRIMARY AND LONG SECTIONED SECONDARY FOR BELT ALIGNMENT

(71) Applicant: Haka Groups Participacoes De Negocios S/A, Belo Horizonte (BR)

(72) Inventor: Frederico Trad, Lima (BR)

(73) Assignee: Haka Groups Participacoes De Negocios S/A, Belo Horizonte (BR)

( * ) Notice: Subject to any disclaimer, the term of this patent is extended or adjusted under 35 U.S.C. 154(b) by 72 days.

(21) Appl. No.: 18/691,526

(22) PCT Filed: Sep. 9, 2022

(86) PCT No.: PCT/BR2022/050362
§ 371 (c)(1),
(2) Date: Mar. 13, 2024

(87) PCT Pub. No.: WO2023/035052
PCT Pub. Date: Mar. 16, 2023

(65) Prior Publication Data
US 2024/0383690 A1    Nov. 21, 2024

(30) Foreign Application Priority Data
Sep. 13, 2021    (BR) .......................... 1020210181087

(51) Int. Cl.
*B65G 23/04*    (2006.01)
*B65G 15/08*    (2006.01)
(Continued)

(52) U.S. Cl.
CPC ............. *B65G 23/04* (2013.01); *B65G 15/08* (2013.01); *B65G 23/23* (2013.01); *B65G 54/02* (2013.01);
(Continued)

(58) Field of Classification Search
CPC ........ B65G 15/08; B65G 54/02; B65G 23/23; B65G 2201/04; B65G 23/04; H02K 41/025; H02K 41/031
(Continued)

(56) References Cited

U.S. PATENT DOCUMENTS 3,426,887 A    2/1969    Ward et al.
3,585,939 A *  6/1971    Laithwaite .............. B60L 13/03
                                                          104/291

(Continued)

FOREIGN PATENT DOCUMENTS

BR    PI 8105580-3    4/1983
BR    PI 8302826-9    1/1985
(Continued)

*Primary Examiner* — James R Bidwell
(74) *Attorney, Agent, or Firm* — Defillo & Associates, Inc.; Evelyn A. Defillo (57) ABSTRACT

A conveyor belt driven by linear motors distributed along the belt, rather than at the head thereof. These linear electric motors or of the induction type with a short primary (5) having two action sides and a long secondary (2) made of plates (8; 12) of conducting material, such as aluminium or copper. The secondary (2) plates (8; 12) are vertically fixed in the central portion of the rubber belt (1) or metal plates (22). The invention is equipped with split central load rollers (14) and return drums (3) with grooves (11) accommodating the passage of the secondary plates (8; 12) during the belt (1) path.

10 Claims, 10 Drawing Sheets

(51) Int. Cl.
  *B65G 23/23* (2006.01)
  *B65G 54/02* (2006.01)
  *H02K 41/03* (2006.01)

(52) U.S. Cl.
  CPC ...... *B65G 2201/045* (2013.01); *H02K 41/031* (2013.01)

(58) Field of Classification Search
  USPC .......................................... 198/818–824, 805
  See application file for complete search history.

(56) References Cited

U.S. PATENT DOCUMENTS

| | | | |
|---|---|---|---|
| 3,788,447 A | 1/1974 | Stephanoff | |
| 5,014,625 A | 5/1991 | Murai et al. | |
| 5,398,804 A * | 3/1995 | Ecker ..................... | B65G 21/22 198/805 |
| 6,528,908 B1 * | 3/2003 | Lee ........................ | H02K 41/03 310/12.24 |
| 7,597,190 B2 | 10/2009 | Lee | |
| 8,502,422 B2 | 8/2013 | Lykkegaard | |
| 10,155,624 B1 * | 12/2018 | Nix ........................ | B65G 15/08 |
| 12,264,015 B1 * | 4/2025 | Bray ...................... | B65G 54/02 |
| 2024/0055967 A1 * | 2/2024 | Renedo Anglada .. | H02P 25/062 |

FOREIGN PATENT DOCUMENTS

| | | | | |
|---|---|---|---|---|
| CN | 1651325 | | 8/2005 | |
| CN | 2188197 | | 5/2010 | |
| DE | 2110821 | | 10/1971 | |
| DE | 2134055 | | 1/1973 | |
| DE | 4311863 C1 * | | 8/1994 | ............ B65G 23/23 |
| FR | 2189283 | | 1/1974 | |
| GB | 1419358 | | 12/1975 | |
| WO | WO2003036781 | | 5/2003 | |
| WO | WO2011042487 | | 4/2011 | |
| WO | WO2021058800 | | 4/2021 | |

* cited by examiner

CONVEYOR FOR GRANULAR MATERIAL DRIVEN BY LINEAR INDUCTION MOTOR WITH DOUBLE-SIDED PRIMARY AND LONG SECTIONED SECONDARY FOR BELT ALIGNMENT

CROSS REFERENCE TO RELATED APPLICATION

This application is a National Stage Entry of PCT/BR2022/050362 filed Sep. 9, 2022, under the International Convention and claiming priority over Brazil Patent Application No. 1020210181087 filed Sep. 13, 2021.

FIELD OF THE INVENTION

The present invention relates to equipment such as a conveyor belt powered by a linear induction electric motor, to be used in the mining industry for transporting granular loads, in ports for cargo transport, in feeding furnaces in steelmaking, cement industry, quarries, and also in other markets such as agribusiness. This invention also has applications in the fields of mechanical engineering and electrical engineering.

PRIOR ART

Various types of materials, such as grains, ores, fruits, wood, sand, etc., can be transported by conveyors. These materials have specific characteristics that must be taken into account in the design of the conveyor system, such as density, granularity, and effective angle for transportation.

Conveyors used for transporting granular materials can be of the rubber belt type or the metal conveyor type. This invention applies to rubber belt conveyors, metal conveyors (also commercially known as plate conveyors, shoe conveyors, metal feeders, or Apron Feeders), and vertical conveyors called bucket conveyors or bucket elevators.

Conventional belt conveyors are the most economical motorized conveyors and are typically used for transporting products over long distances, at high speeds, or for applications on inclines/declines. This system uses a series of components, gears, bearings, rollers, drums, belt tensioners, and structures to compose the transport mechanism. The belt is supported by a series of rollers along the path and is usually pulled by a motor with a reduction box at its end.

The use of all these components is part of the conventional approach to linear conveyor equipment, and the source of efficiency losses lies in the positioning of the motor assembly, located at the end of the conveyor belt and not distributed along the path, as is the load.

Another observed fact is that, in the case of a failure in the motor assembly of a traditional conveyor, the operation must be reduced or even interrupted, resulting in a significant impact on production.

The stoppage of a conveyor not only affects production but also jeopardizes operational safety since the productive activity consists of a chain of processes. When a process needs to be interrupted, the subsequent chain of activities is affected, mobilizing numerous measures and actions to protect equipment, worker safety and health, environmental protection, and economic factors.

There are strong indications that distributed motorization could contribute to numerous positive factors in an application involving linear conveyors.

The proposed invention allows for simplification of the motor assembly of conveyor belts. Conventional belts, no matter how long, pull the rubber belt along with its load through the drive drum located at one end of the conveyor. This fact leads to the need for belt tensioning mechanisms to maintain traction without slipping and to prevent deflections of the rubber in the sections supported between rollers.

In the case of metal conveyors, conventional motorization is carried out on the drive shaft with the motor and reduction box attached to this shaft. There is a robust metal chain providing traction through gears fixed to the motor shaft. With the proposed invention, motorization becomes distributed along the metal conveyor, eliminating the use of the reduction box and traction by the sprocket, reducing local tensions, and reducing the size of the chain, which now serves only as a guide. The invention, therefore, aims to simplify and reduce the cost of this type of equipment.

Traction loads on rubber conveyors, depending on the equipment, are in the order of hundreds of tons, requiring additional electrical power consumption only to address the problem generated by the positioning of the motors at the end of the conveyor. Furthermore, the mechanical tension added to the equipment increases friction between components, leading to wear and system inefficiencies.

The presented invention consists of a conveyor belt driven by distributed linear motorization along its length in the form of a double-sided linear induction motor. The primary remains stationary and fixed to the conveyor structure, while the secondary moves relative to the primary, pulling the belt and its load.

The secondary is made of blades of conductive material such as aluminum or copper mounted on the belt in the vertical position on its central longitudinal axis on the inner face of the conveyor circuit. We present two options for mounting the secondary blades:

Partial overlap in the sequence of the plates to allow for the continuity of the plates as they pass between the two active faces of the double-sided motor and, at the same time, enable the curvature of the conveyor belt and the secondary on the return drums.

Trapezoidal geometry of the secondary plates to allow for their accommodation on the return drum during the belt return turn.

Both options are described in this document.

The use of linear motors makes the conveyor system a more sustainable equipment, as it has less impact on the environment compared to other comparable equipment. Some benefits are mentioned below:

In the configuration of a conveyor driven by a linear motor, there is no need for a reduction box or gears. Therefore, there is no need for lubrication of these elements that will not exist;

Linear motors can operate by regenerating energy when the path is downhill and/or when a reduction in the speed of the transported material is required;

Linear motors may have a lower operating temperature compared to rotary motors, due to the possibility of abandoning the use of casings. This characteristic can improve heat exchange, thus increasing efficiency;

By reducing the number of mechanical elements, the wear of parts is reduced, reducing maintenance costs; friction losses are eliminated, and the energy consumption of the equipment is improved;

The mechanical support structure of the conveyor can be incredibly reduced, as well as the counterweight mass, due to the decrease in mechanical tensions on the conveyor. This feature expands the applications of this equipment and reduces manufacturing and operational costs, assembly, and maintenance;

With the use of multiple linear motors, the occurrence of a failure in one unit does not cause the equipment to stop, as the load from the problematic unit is distributed to the other motors through central control; Linear motors allow for stepped operation with variable load percentages, unlike equipment with rotary motors that tend to binary operation (active or paralyzed);

It will be possible to monitor the actual speed of the conveyor throughout the path, resulting in better equipment control; The use of rotary motors complicates this monitoring due to the elastic behavior of the conveyor along its length;

The replacement of a linear motor unit can be performed with the conveyor in motion, as there is no mechanical coupling between the parts;

Braking can be performed by the linear motors themselves;

Starts and stops can be smoother due to the distributed traction;

As the tensioning force should be lower, the effective tension also tends to be much reduced, implying lower mechanical stress on the belt, reducing wear and the risk of rupture;

The total power of the equipment should be lower to pull the same load as a conveyor driven by a rotary motor. Thus, the power sources for the linear motor-driven conveyor can be smaller and cheaper.

DESCRIPTION OF THE PRIOR ART

Prior Art

To develop this invention, a thorough search was conducted in various patent databases, researching the state of the art of equipment: linear motors and conveyor belts that use such technology. The significant advantage of linear motors is that they eliminate the need to convert rotary motion into linear motion. This conversion causes efficiency loss due to the association of various mechanical components prone to failures, wear, and friction. By using linear motion directly, linear motors open a new frontier in engineering and are currently being considered for various equipment that has always been present in everyday life but has traditionally used rotary motion. Numerous patents for linear motors have been registered, both in Brazil through the INPI since 1982, and patents related to linear conveyors using various linear motors at the international level. Each patent was examined to identify any similarities with the application in question, in both open-air and mining-oriented environments, aiming to chart a different path for solving the problem.

In general, it can be asserted that the proposed invention stands out from previous inventions for the following reasons:

Utilizes a linear induction motor rather than a synchronous motor, direct current motor, or stepper motor;

Implements a dual-sided linear induction motor configuration, enhancing traction force for the same section of the secondary blade;

The dual-sided linear induction motor configuration also benefits belt centralization and alignment with the transport direction due to repulsion forces between the active faces of the primary and the blades of the secondary;

Introduces a metallic secondary fixed vertically to the moving conveyor belt with split rollers and drums;

Presents two configurations for the secondary motor blade, one with blade overlap and another trapezoidal;

Incorporates centering guides for the secondary that contribute to the operation, also aligning the conveyor belt.

Regarding the prior art found in the literature, we can mention the following:

1989|DuPont: Useful system for controlling multiple synchronous secondaries of a linear motor with an elongated path—[PI 8707773-6]: "A useful system for controlling multiple secondaries of a linear motor arranged along an elongated path, the system having a linear synchronous motor with its elongated primary arranged along the elongated path and at least one secondary responsive to the primary." This patent is characterized by a long primary linear synchronous motor and multiple short secondaries.

2005|VM: Linear Synchronous Motor with Multiple Time Constant Circuits, a Secondary Synchronous Stator Member and Improved Method for Permanent Magnet Assembly—[PI 0311239-0]: "The present invention relates to a linear synchronous motor comprising a specific main part and a secondary part. The secondary portion is a ferromagnetic backplate. An arrangement of permanent magnets is attached to the backplate, so that a variable or fixed pole pitch occurs in a precise manner between at least two magnets of alternate polarity, which improves existing methods for connecting, guiding, protecting, and enhancing the total flux arrangement produced and emitted by the permanent magnets. A single-piece linear secondary stator member accompanies a main member, the synchronous linear permanent magnet motor. The electrical frequency of the stator is adaptable to allow a wide range of braking applications." This patent is characterized by a Long Induced Linear Synchronous Motor. Also used as an electrodynamic brake for elevators, as well as entertainment transports, such as drop towers, roller coasters, and any other mobile device requiring high-thrust and reliable braking applications.

1969|Herbert Morris Ltd: Drives for conveyors—U.S. Pat. No. 3,426,887A: "This invention relates to improvements in drive units for conveyor belts or chains employing a linear motor of the type comprising two members separated by an air gap, one member being of ferrous metal and the other member being a multiphase AC-energized coil assembly and having a laminated toothed core. The invention comprises a drive unit of the type referred to for a belt or conveyor chain in which a plate or strip over or forming the conveyor acts as the movable ferrous member of the motor and is centered in a horizontal plane during operation, incorporating a pole in the toothed core, together with the coil assembly windings acting as a stationary member of the motor." This patent is characterized by a linear motor system for a conveyor belt. A ferrous material secondary is fixed on the belt in a horizontal position, and the primary with an iron core remains stationary. It differs from the proposed invention in the arrangement of the secondary segments and the type of motor used.

1974|PT Components Inc: Linear motor conveyor—U.S. Pat. No. 3,788,447A: "A conveyor using a linear motor has an endless guide support in which the linear motor stators are housed. Conveyor segments are articulated in an endless loop for articulated movement, both horizontally and vertically, or both, along the endless path defined by the guide support. The conveyor segments, which have an armature portion extending through slots in the guide support, are retained in the guide support in all orientations of the conveyor by laterally extending portions, including a load support portion. The conveyor is driven along the guide track by the electromagnetic coupling of the linear motor stators with the armature portions of the conveyor segment loop." This patent is characterized by a linear conveyor with articulated secondary for vertical and horizontal curves. Stationary primary. The belt is metallic, and it is the secondary itself that has slots. It does not use a rubber belt, and the plates of the secondary are not attached to the rubber. It also differs from the metallic conveyor mentioned in this invention due to the vertical and perpendicular shape of the secondary about the conveyor belt.

2003|Siemens: Electric linear motor and secondary for a linear motor—WO2003036781A2: "An electric linear motor with a secondary component, a slide, and a cover, for protecting the secondary component against contamination or damage. According to the invention, the cover is mounted on rollers, allowing it to move so that contaminated regions of the cover can be removed from the surface of the secondary part and cleaned of using a stripping element. This patent is characterized by a linear motor in which the secondary is the stator of this motor and is characterized as a conveyor.

2005|Zhejiang University ZJU: Direct driving type belt conveyor—CN1651325B: "The invention discloses a material transport device driven by a linear motor, comprising a support structure, drums, a conveyor belt, support rollers, a linear motor, and a controller. It states that the primary windings of the linear motor are arranged along the central line of the conveyor belt and are installed in the support structure together with the support rollers. The secondary windings of the linear motor, corresponding to the primary windings, are arranged on the inner surface of the annular conveyor belt. The secondary plates are arranged transversely along the longitudinal direction of the conveyor belt discontinuously in a closed arrangement. The material transport device effectively reduces costs and favors automatic monitoring, control, maintenance, and management. Meanwhile, the device has uniform force distribution and stable operation, which is especially suitable for long-distance material transport operations." This patent is characterized by multiple linear motor units distributed along the conveyor. It differs mainly in the fact that the secondary plates are positioned on the middle line of the conveyor, located in the horizontal plane of the belt surface, and by the type of linear motor used.

2006|Bastian Solutions LLC: Belt including a flexible rare earth magnetic strip and conveyor utilizing a belt including a flexible rare earth magnetic strip—U.S. Pat. No. 7,597,190B2: "The invention relates to straight or curved induction-driven conveyors. Among other things, the present invention relates to conveyor belts having a flexible strip or layer of one or more compositions of rare earth magnets incorporated therein. The belts of the present invention are particularly useful in material handling arts. The strip may extend the entire length of the belt or sections of the flexible permanent magnetic composition may be incorporated into the belt. One or more belt stretch limiting members may be positioned near the flexible magnetic strip. The stators in combination with the flexible strip induce magnetic flux for advancing the conveyor belts." This patent is characterized by straight or curved induction-driven conveyors. The belts of the invention have a flexible strip composed of rare earth magnets. In combination with the flexible strip, the stators induce magnetic flux to advance the conveyor belt.

2010|Caterpillar Global Mining Hms GmbH: Extraction device, particularly for mining, and method for controlling the extraction device—EP2188197B1: "The invention relates to an extraction device, particularly for mining, comprising two drive stations and a drive chain circulating between the gearwheels thereof, to be able to detect a hanging chain or wear of the chain in a supply chain system in a supply system, or a flat chain in a flat system, magnetic sensor units are provided for detecting at least one chain state of the transmission chain, wherein each sensor device comprises a transmitter formed by a generator of a static or dynamic magnetic field and a detector field provided with a plurality of magnetic field detectors as a detector that is arranged beside a passage for the transmission chain wire to be scanned. The invention further relates to a method for controlling an extraction device to prevent hanging chains." This patent is characterized by a mining device that features a transmission chain and sprockets with magnetic sensors on side panels. The purpose is for the control and tensioning of the belt.

2011|Siemens: Conveyor system comprising an electromagnetic brake—WO2011042487A2: "The invention relates to a transport system comprising a transport device that can be moved along a substantially vertical path and a linear motor comprising a primary part, arranged on said transport device, and a secondary part arranged along the travel path. The primary part has a primary winding and at least one permanent magnet and the secondary part has a profile in the direction of the travel path, comprising grooves and teeth alternately arranged. To increase operational safety, a brake winding is arranged in the secondary part so that it can generate a braking force interacting with the permanent magnet to brake said transport device." This patent is characterized by a transport system for vertical movements driven by a linear motor that comprises a primary part composed of a winding and a magnet and a secondary part arranged along the path with grooves and teeth. It also includes a brake. It differs by using magnets to complete the magnetic circuit.

2013|BG: Sorting System with Linear Synchronous Motor Drive—U.S. Pat. No. 8,502,422B2: "The present invention relates to a sorting system comprising a conveyor with a plurality of carts for transporting items, particularly for sorting items such as packages and luggage scanners. The conveyor features a linear synchronous motor drive system with stators arranged along a track that the carts follow. Reaction elements are mounted on each of the carts. Each reaction element comprises an even or odd number of permanent magnets arranged on a plate-shaped support. The magnets in reaction elements of adjacent carts are arranged to form a row of alternating polarity magnets, with the said row having two neighboring magnets. At least one of the two neighboring magnets has a reduced dimension in the direction of transportation, and the two neighboring magnets are situated at a transition between adjacent carts." This patent is characterized by a system for classifying or separating objects characterized by transporting articles through a linear conveyor driven by a linear synchronous motor whose stator is distributed along the path. It uses magnets on the conveyor plates.

More specifically, the patent document U.S. Pat. No. 3,788,447 discloses a conveyor equipped with multiple linear motors, where a long primary is driven by them. The American creation was designed for the transport of articles such as bottles, packages, or other loads. On the other hand, the present invention has been designed for the transportation of granular materials, such as high-mass ores, over long distances and at high speeds.

The conveyor is guided by an endless guide support. Thus, the conveyor segments are articulately linked in an endless loop to articulate movement, horizontally or vertically, or both, along the endless path defined by the guide support. The American document is also equipped with an endless flexible conveyor made of individual rigid transport segments. The endless conveyor moves over an endless guide track, which is supported by frame members. The endless guide track has the shape of an endless rectangular cross-sectional tube, with a first support surface, a second support surface, and two vertical side surfaces extending between the support surfaces.

The endless guide track then has support surfaces that are mostly horizontal, although they curve as they guide the conveyor from the upper transport section to the lower return section.

It is clear from the U.S. Pat. No. 3,788,447 patent document that the looping of the conveyor belt is achieved through the endless guide track. Advantages for the transport of ores and other granular materials, the conveyor has a return drum with grooves for accommodating the secondary, keeping the belt stable without the risk of misalignments.

The document WO2021058800 reveals a conveyor system that includes multiple carts moving along a track to deliver parcels to designated areas along the track. The conveyor system in this document also includes multiple carts moving along a track, along with one or more feeding belts that provide packages to the carts. Similar to the American document U.S. Pat. No. 3,788,447, the carts are guided by a track and are designed for the transport of packages. Advantageously, the present invention does not use carts. Specifically, for the transport of ores and other granular materials, the conveyor has a return drum with grooves to accommodate the secondary, keeping the belt stable without the risk of misalignments.

The German document DE2110821 reveals a belt conveyor equipped with a secondary (non-magnetic and highly conductive material armature) that is driven by linear induction motors (primary). In this document, the return drums are not shown in the drawings. In any case, there are no grooves to accommodate the secondary on these drums, since the belt is disadvantageously bent along with the secondary. This is shown in the German document, which reveals that the rubber housing the secondary has a kind of ridge. In the vicinity of this ridge, there are longitudinal grooves that allow the belt to flex as it passes around the end drums. In contrast, the present invention advantageously has grooves on the return drum. Thus, the secondary is not bent, increasing the lifespan of the transport system and promoting belt alignment.

BRIEF DESCRIPTION OF THE FIGURES

The entire system can be better understood through the following detailed description, in line with the attached figures, where:

FIG. 7b shows a front view of FIG. 7a;

FIG. 7c shows a perspective view of FIG. 7a;

FIG. 8b shows a front view of FIG. 8a;

FIG. 8c shows a perspective view of FIG. 8a;

FIG. 9a shows a side view of the conveyor with the complete transport loop for a better understanding of the system. This figure shows the arrangement of several primary units of the motor installed on the upper and lower branches of the transport belt.

FIG. 9b shows perspective view of the conveyor of FIG. 9a;

FIG. 13 shows another type of linear conveyor that uses distributed motorization. In this configuration, the conveyor operates in the vertical position and is called a bucket conveyor. In this illustration, the vertical segment of the bucket elevator is shown, where along with the loading compartment called a bucket, the secondary of the motor positioned inside the transport loop formed by the flat rubber belt, and the primary units of the linear motor.

DETAILED DESCRIPTION OF THE INVENTION

The distribution of the load of the material transported on conveyors naturally leads to distributed propulsion, especially in long conveyors.

Linear motors, therefore, offer greater control over the transported load, eliminating operational inefficiencies when compared to conventional concentrated propulsion at the head of the conveyor.

Figure 1:
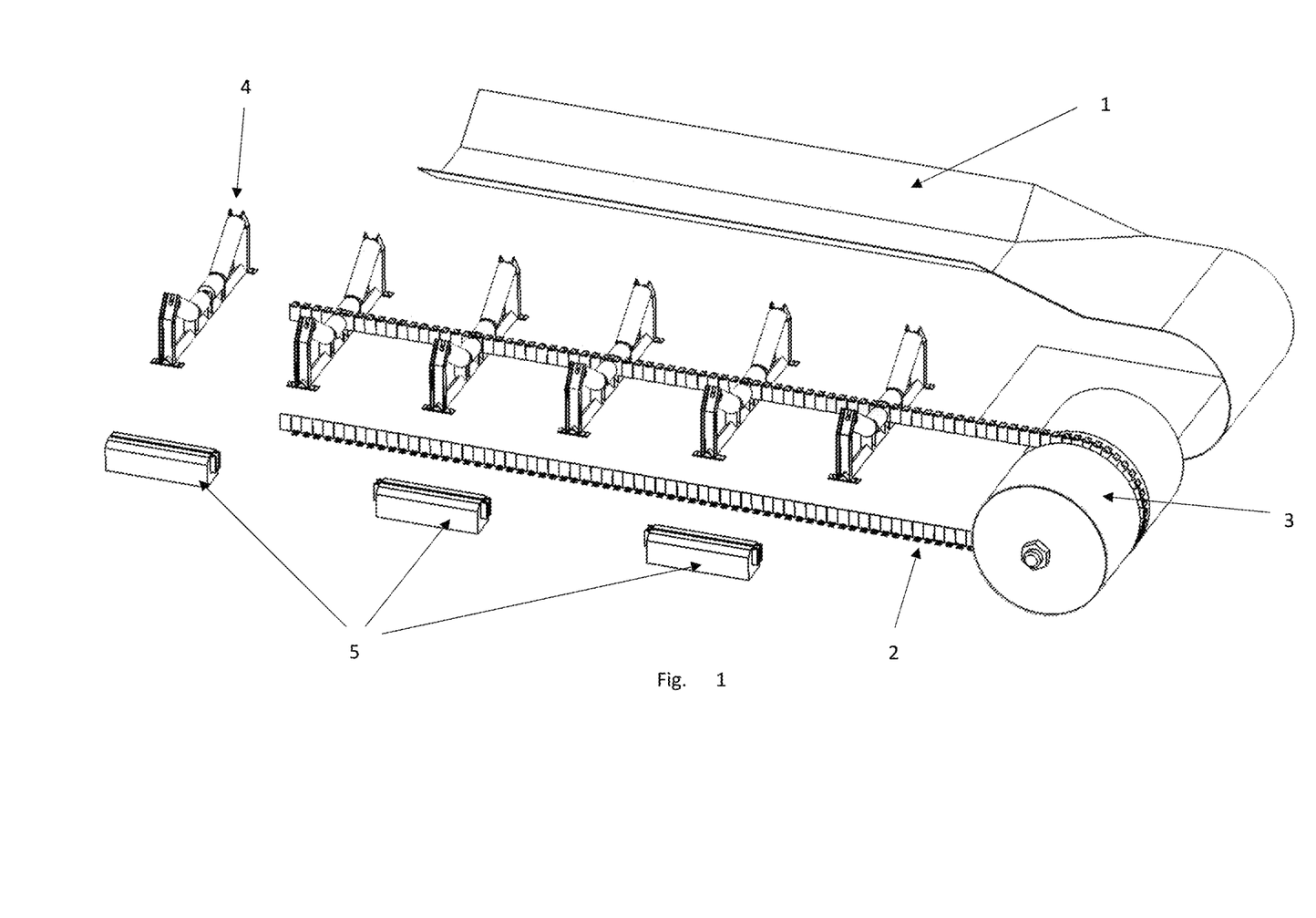
FIG. 1 shows a partially exploded view of the transportation system in which it is possible to observe the rubber belt, the secondary plates of the motor, the return drum at one end of the conveyor, the roller support structure of the conveyor belt, the representation of the primary units of the linear motor distributed along the length of the conveyor. This figure illustrates only one end of the equipment; the other end of the conveyor is symmetrical and can be seen in FIG. 7.
Figures 9A, 9B:
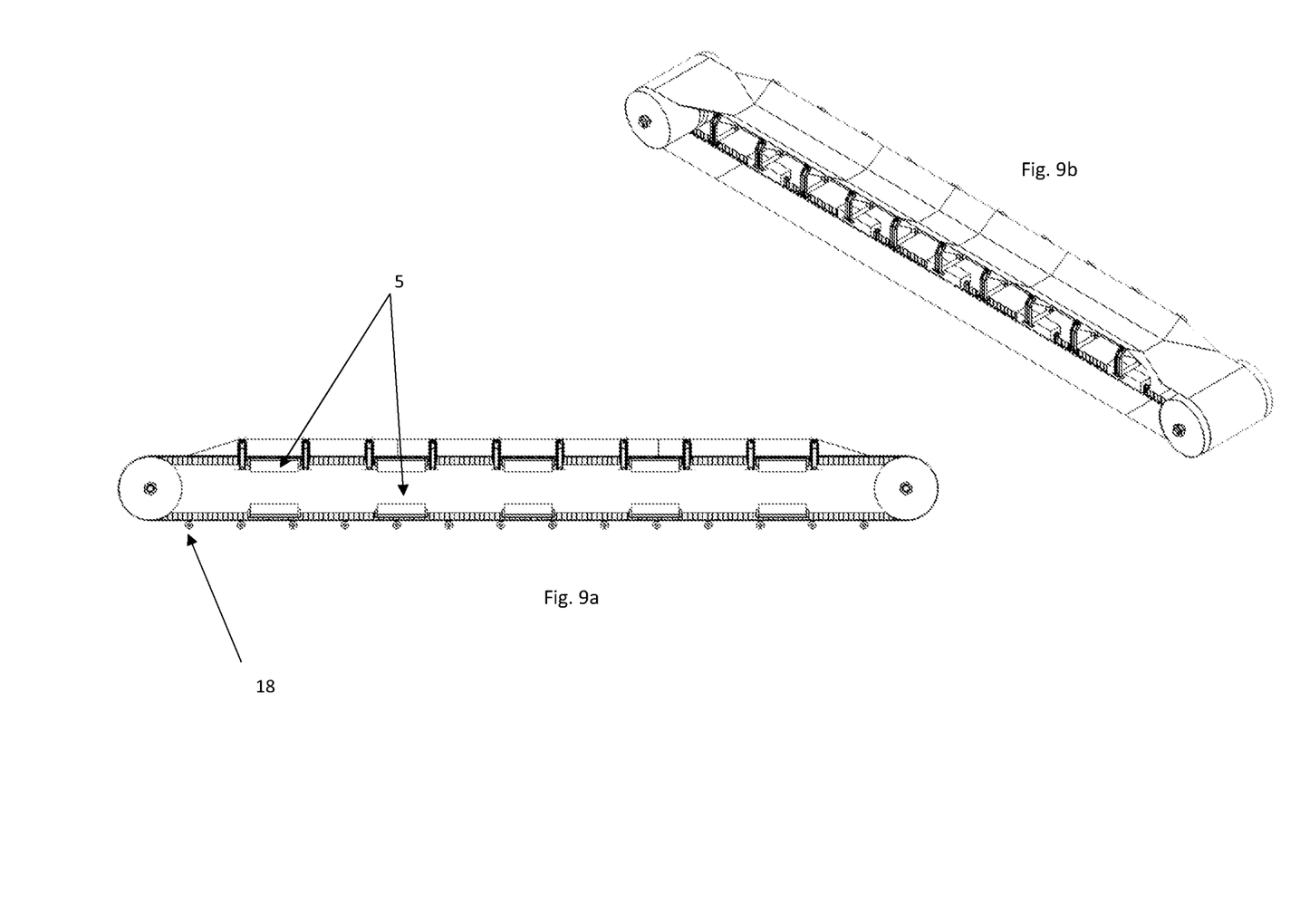

Referring to these figures, it is possible to observe, in FIG. 1 and FIG. 9b, the general arrangement of the main equipment that composes the conveyor belt, in this version, with distributed traction along its length through various units of primary linear motors that are summed up to reach the power required to perform the work on this conveyor.

In the linear motor used, the primary (5) of the induction electric motor remains static and integral to the conveyor structure, while the secondary (2) of the motor moves relative to this primary (5).

The primary part is the active equipment that receives electrical power to activate its windings. The motor used is of the active dual-sided type where these sides correspond to two sets of iron cores and various windings that are positioned against each other, forming a central gap through which the secondary plates (2) must pass for induced current generation.

Electromagnetic forces are generated by the primary (5) through the control of electric current and frequency in the windings of its coils. Control and drive are performed by frequency inverters.

The generated force is transmitted without contact from the primary to the secondary plates, maintaining a distance between the faces of both called the "air gap."

The segmented plate secondary (8; 12) is guided in the gap by the electromagnetic forces generated in the primary (5) and thus pulls the belt (1) that is free to translate supported on rollers (14, 15, and 18) and drums (3).

The load of material to be transported is deposited in a distributed manner on the upper surface of the belt (1) and is carried by the movement generated in the linear motor.

The linear motor also serves to center the belt on top of the conveyor roller structure. Sometimes, granular loads may be deposited asymmetrically on the belt, and conventional conveyors, this leads to misalignment between the belt and the rollers (14, 15, 18) and drums (3). With the linear motor, this issue tends to be reduced due to the presence of guide elements (6) and the fact that the force applied to the secondary (2) has a restoring property of central positioning. If any plate (8,9) is closer to one of the faces of the primary, it should experience a repulsive force, bringing it toward the middle of the gap formed by the faces of the primary.

The conveyors (1), usually made of rubber for applications in granular transport, remains supported on top of load rollers (14; 15, and 18) and performs a closed cycle, looping around return drums (3).

Figures 2A, 2B:
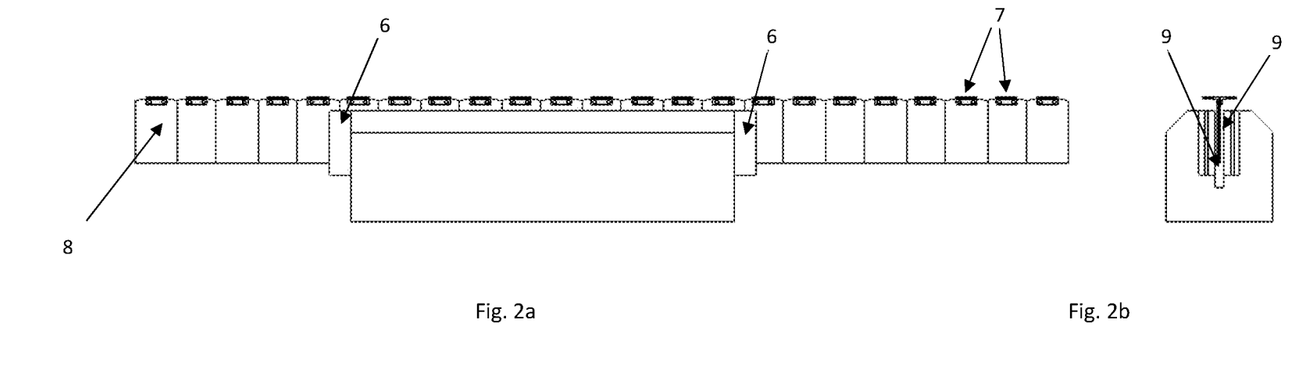
FIG. 2a shows a side view of the linear motor displaying: the centralizing devices of the secondary plates, the plate fixations, the overlapping type secondary plates.
FIG. 2b shows the lateral free space between the active faces of the primary and the secondary plates, commonly referred to as the air gap.
Figure 4A:
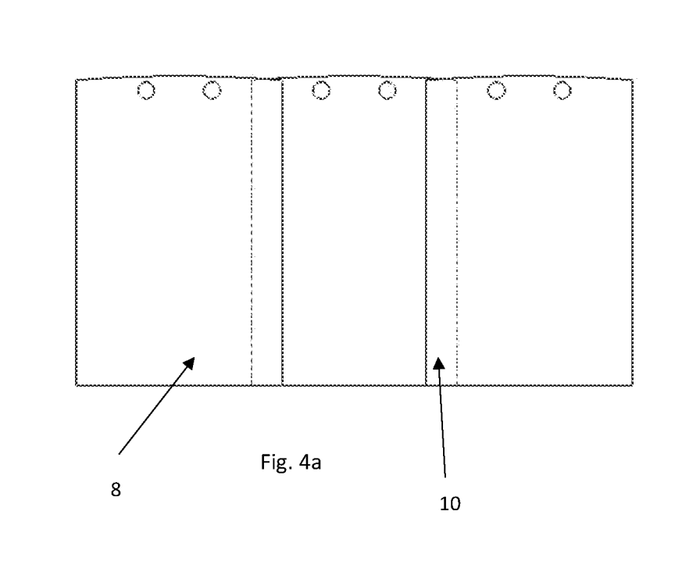
FIG. 4a shows the side view detail of the plates of the secondary version with overlapping plates.
Figure 4B:
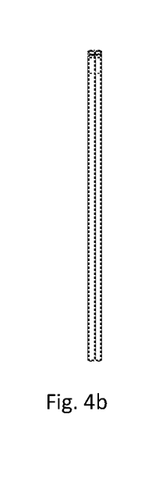
FIG. 4b shows a respective front view.
Figure 4C:
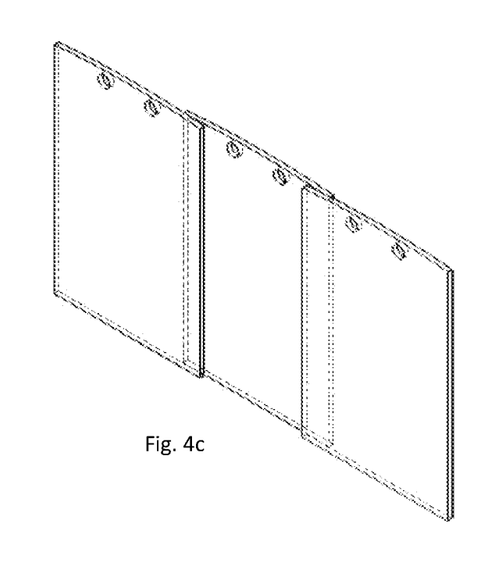
FIG. 4c, the perspective view.

In FIG. 2, the version of the linear motor with overlapping plates is depicted. The overlapping plates (8), made of conductive material such as aluminum or copper, form a continuous train with some overlap (10). This overlapping of the plate faces (FIG. 4a) allows the continuity of the secondary, enabling the full utilization of the plate area that passes through the middle of the internal faces of the primary motor. This fact also allows the continuous secondary (2) to follow the curvature of the return drums. These drums must have a compatible diameter for the dimensions of the plates (8, 12) to avoid jamming due to deformation generated by the contact between the plates during pivoting on the curved surface of this drum (3).

Devices called centralizing guides (6) must be installed at the ends of the primary (5) of the motor. They can be of the sliding or rolling type and have the role of guiding the plates (8, 12) to the central position between the active faces of the linear motor primary (5). Thus, an equidistant air gap (9) is maintained between the faces and the motor plates (8, 12). This positioning is important to prevent contact and consequent damage to both parts of the motor. Additionally, the air gap (9) establishes a direct connection with the efficiency and torque of the motor.

In FIG. 2, the fixings (7) of the plates (8, 12) on the rubber conveyor (1) can also be observed. These parts are attached to the secondary (2) plates (8, 12) and are screwed or riveted into the rubber of the belt to allow for working traction.

Figure 3A:
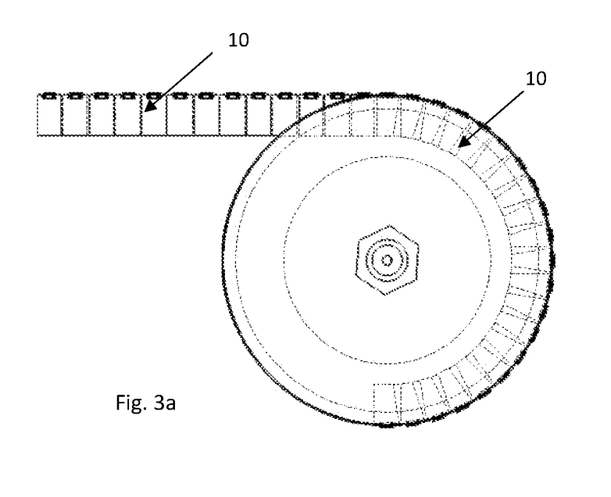
FIG. 3a shows the arrangement of the sectioned secondary plates, of the overlapping plate type, in the curved section on the return drum in a side view, where: is shown the overlap section of plates both in the straight and in the curved return.
Figure 3B:
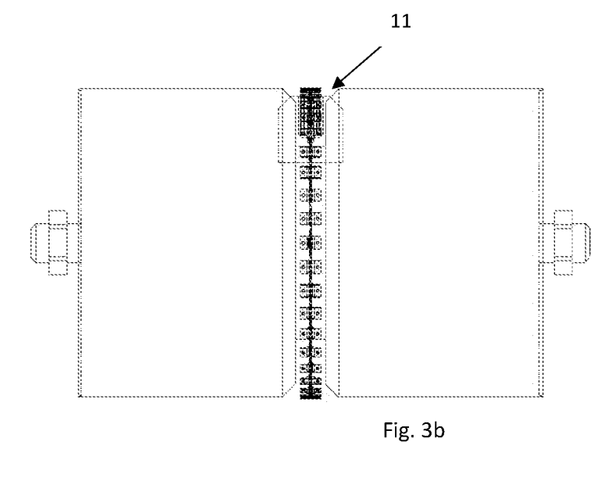
FIG. 3b is the groove on the return drum to allow the accommodation and operation of the secondary plates during the return curve.

The return drum (3) can be seen in FIGS. 3a and 3b, as well as its equatorial groove (11) that permeates the entire cylindrical surface and allows for the accommodation of the motor's secondary (2) plates (8, 12) during the return curve of the belt cycle.

Figure 5A:
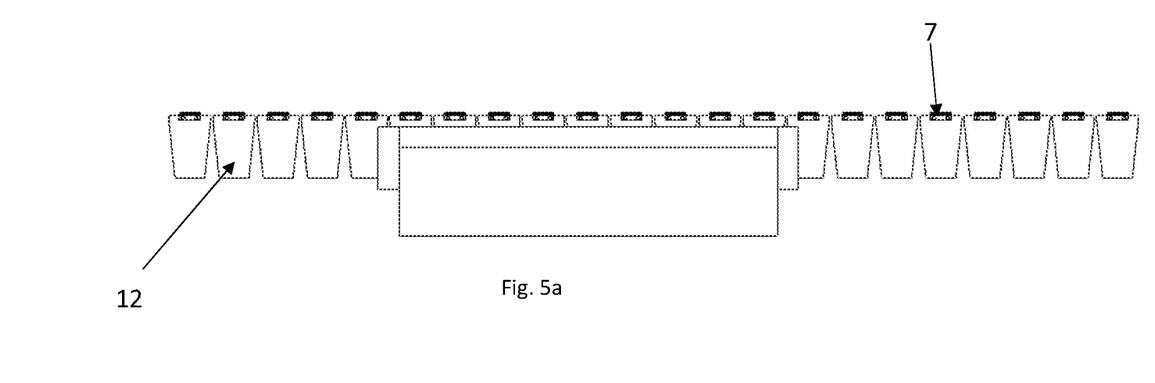
FIG. 5a represents a side view of the second geometry of secondary plates that can be used in this belt conveyor. The geometry of this plate is trapezoidal to allow accommodation in the return curvature performed on the return drum. The fixations are the same as the overlapping plates illustrated in FIG. 2.
Figure 5B:
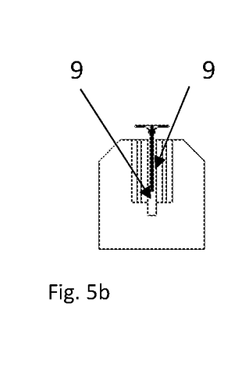
FIG. 5b shows the free space continues to be present.
Figure 6A:
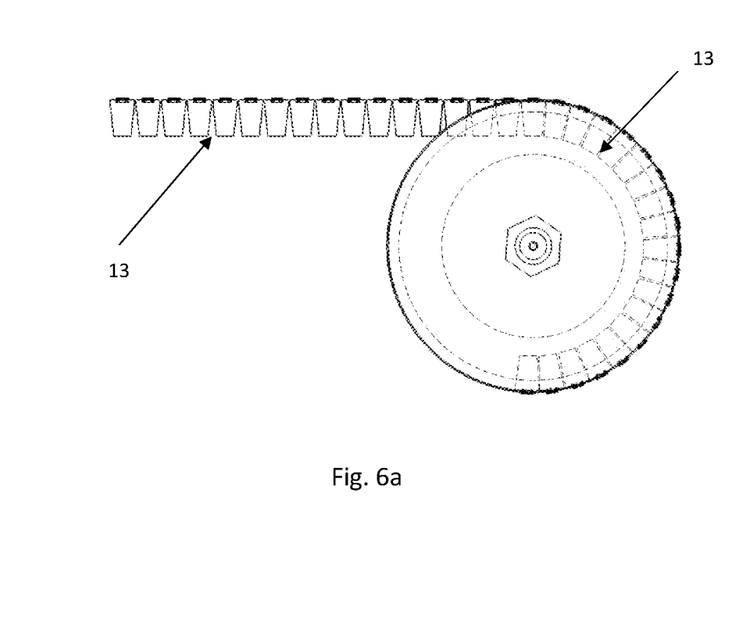
FIG. 6a shows the side view of the curved section for the trapezoidal geometry of the secondary plates where is shown the gap between plates formed by successive trapezoidal geometries. In the curve is also the gap, so that the lateral edges of the trapezoidal plates become parallel.
Figure 6B:
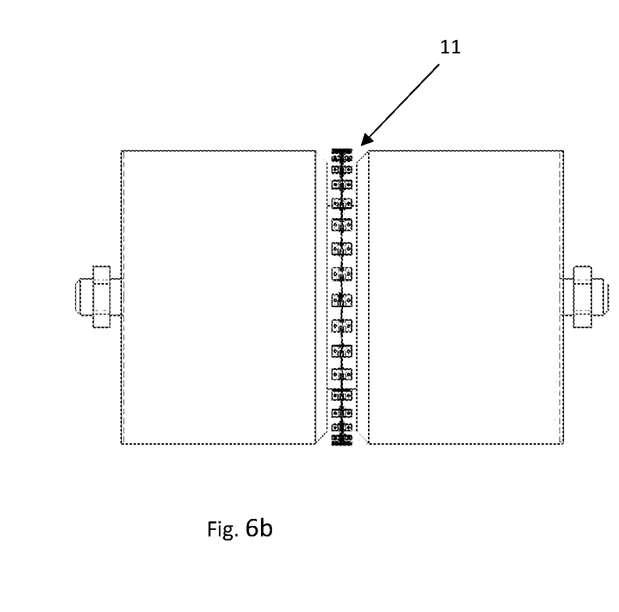
FIG. 6b shows the groove or slots on the return drum to allow the accommodation of the secondary plates.
Figure 7A:
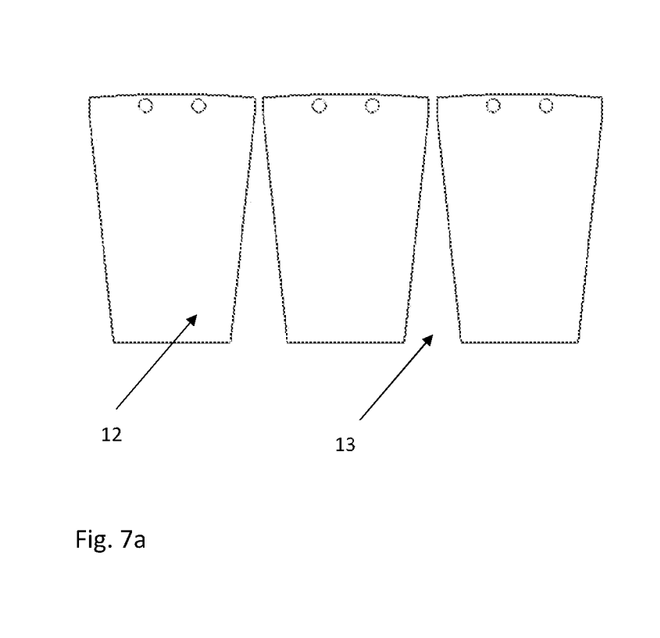
FIG. 7a shows the detail of the version of the secondary with trapezoidal plates.
Figure 7B:
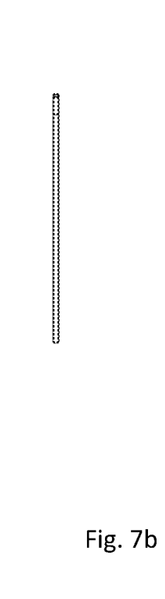
Figure 7C:
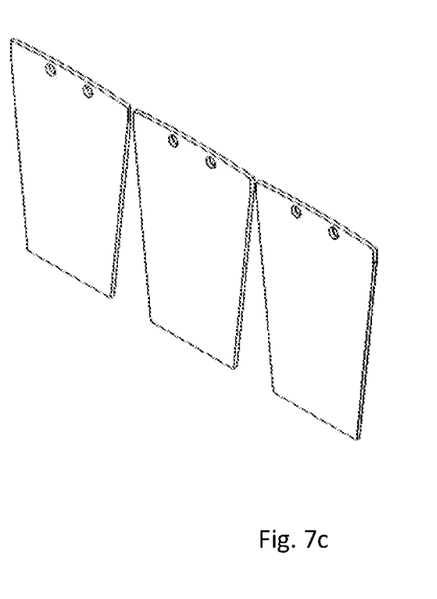

FIG. 5a reveals the second type of segmented secondary (2), the type of plates (12) with trapezoidal geometry. These plates of electrically conductive material are mounted on the rubber conveyor (1) belt in a train-like vertical position one after the other so that there is no overlap of plates (12) in this version of the secondary (2). This fact allows for a shorter distance between the faces of the linear motor primary (5) but causes some efficiency loss due to the existence of empty spaces (13) between one plate and its successor. These details can be better visualized in FIG. 7a.

Figure 8A:
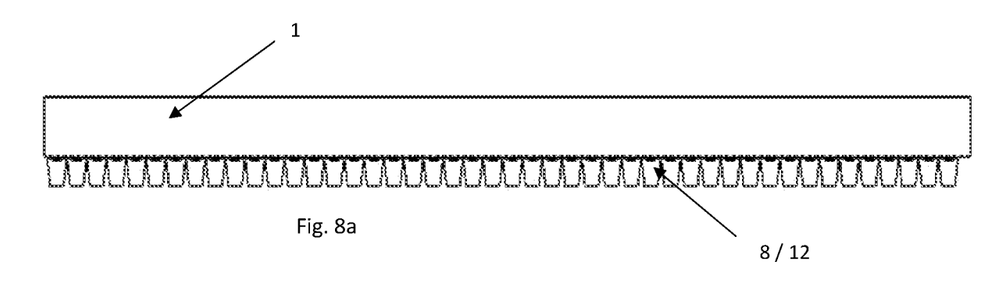
FIG. 8a illustrates the side view of the conveyor belt with the sectioned secondary plates fixed vertically facing the underside of the belt as a "keel.
Figure 8B:
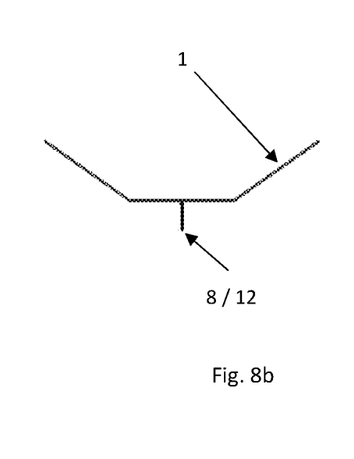
Figure 8C:
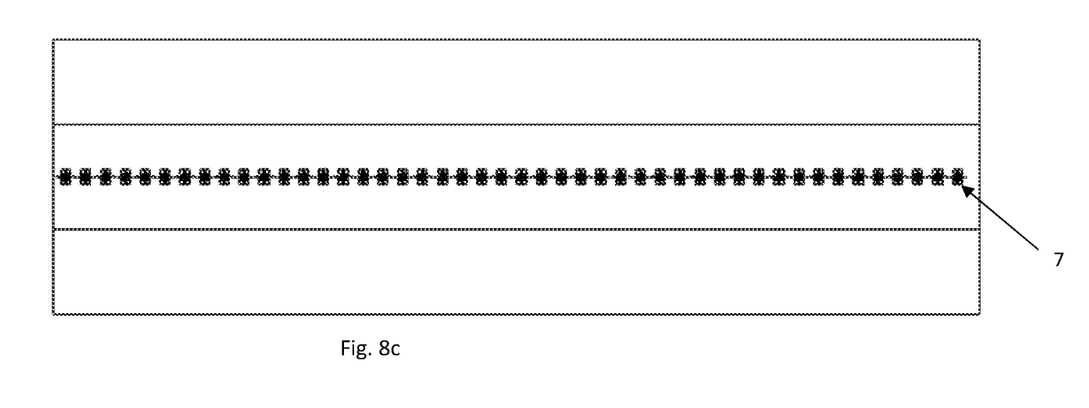

FIG. 8 shows a view of the rubber belt (1) with the secondary plates (8, 12) installed on its lower portion. The fixation should be done either temporarily through screws or rivets attaching the fixator (7) to the rubber (1) or permanently through vulcanization or some adhesive. The possibility of removing the plates is important from a maintenance standpoint, and the possibility of permanent fixation is interesting from an operational safety standpoint. These measures should be considered by the engineers.

FIG. 9a shows a side view of the rubber conveyor belt used for transporting granular materials from mining equipped with distributed linear motorization.

Figure 10:
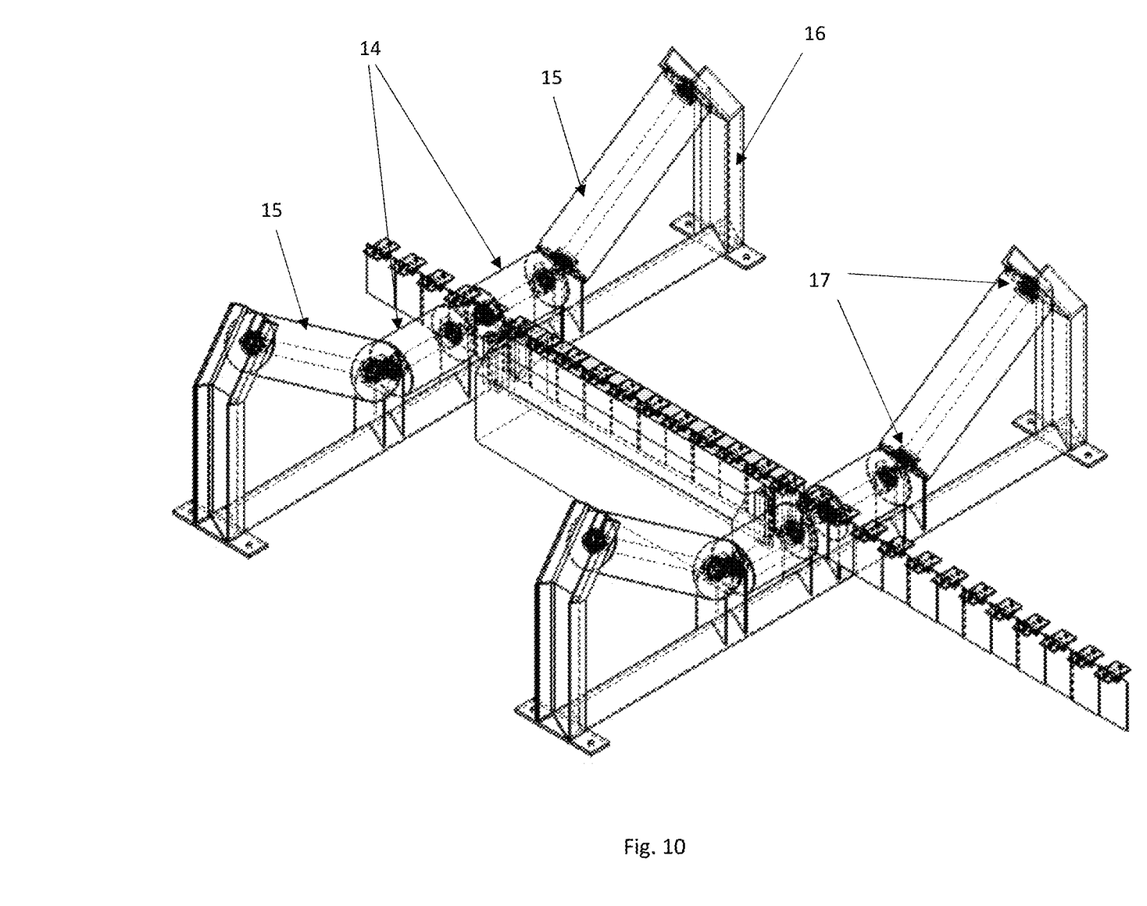
FIG. 10 represents the roller support structure showing the split central roller, the inclined side rollers, the roller support structure in structural steel, and the roller bearings.

FIG. 10 shows the most important parts of the linear motor-driven conveyor equipment, where both a primary motor unit (5) and a section of the secondary (2) can be seen, as well as the metallic support structure (16) for rollers, its central load rollers (14), and the lateral rollers (15). These load rollers (14, 15) support the central weight of the transported load above the rubber belt. In this equipment, the load rollers need to be bipartite to allow the passage of the secondary blades in the central branch between rollers. The distance between these central rollers must be minimal to allow the passage of the plates (8, 12) without compromising the load support by the rubber belt (1).

Figure 11:
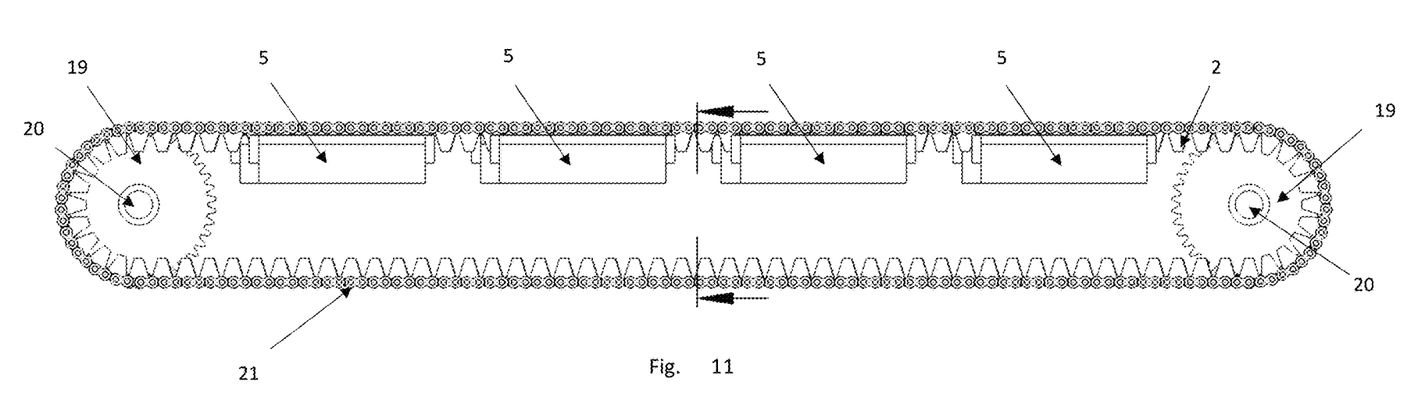
FIG. 11 shows another type of linear conveyor, in a side view called a metallic conveyor/feeder, which is driven by the double-sided linear motor as in FIG. 1. Where it is also possible to observe: the secondary of the linear motor, the sprocket wheel guiding the link chain, the head shafts that are coupled to the sprocket wheels and rotate with the movement of the conveyor.

FIG. 11 illustrates a side view of the drive system of a metal feeder/conveyor, the only peculiarity of this equipment being that instead of a rubber belt (1), metal plates are closing the transport loop circuit. These metal plates (22) carry the volume of granular material from mining, with their ends fixed to the side link chain (21). The chain (21) operates on both sides of the metal conveyor and engages (20) with the return sprockets.

In conventional metal conveyors, traction is achieved through a motor gearbox assembly coupled to the shaft of the return sprockets (20). This invention proposes that this equipment use the same linear motor mentioned in the previous figures like FIG. 2*a* and FIG. 5*a* and no longer use a motor gearbox assembly at its end.

Figure 12:
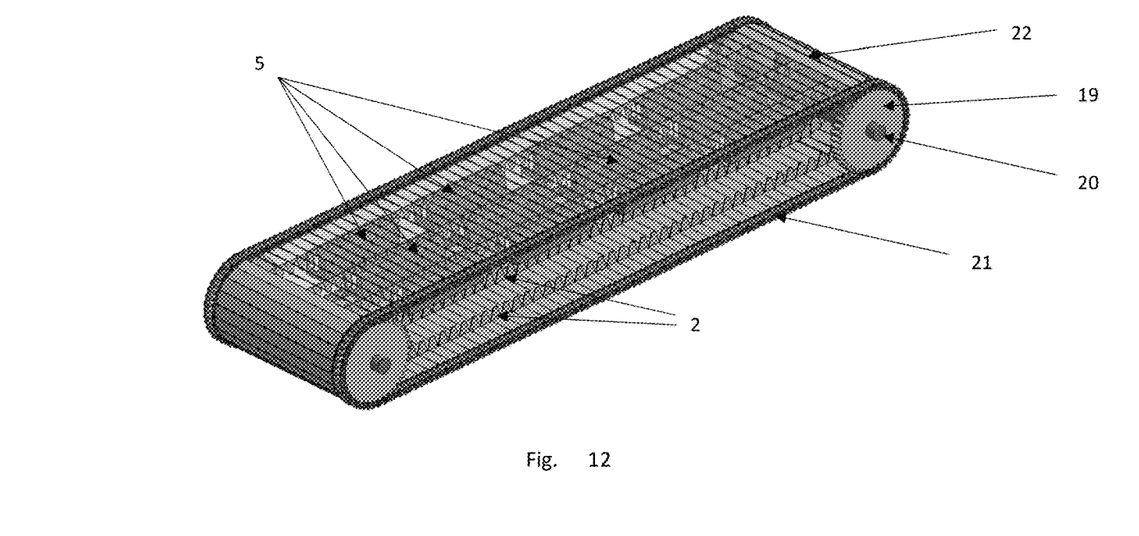
FIG. 12 shows another view of this metallic feeder (apron feeder) where it is possible to observe that several sets of linear motors can be installed in parallel, in the available space within the transport loop formed by the metal belt.

FIG. 12 shows an isometric view, where 3 sets of linear motors aligned parallel to the longitudinal axis of the equipment are visualized. Since this metal feeder operates with very high workloads and has a greater width, it allows for distributed motorization both in its length and width.

Figure 13:
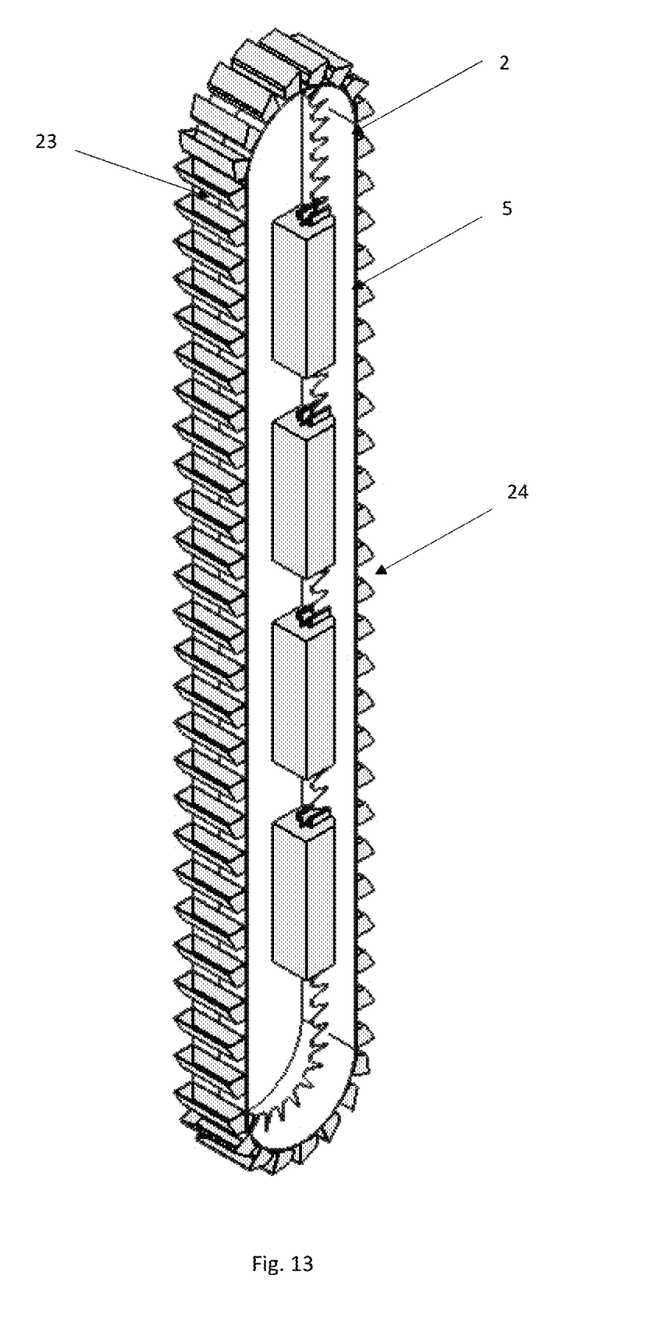

FIG. 13 illustrates a vertical conveyor or bucket elevator as it is commercially called. The peculiarity of this equipment is to operate in the vertical position and have "buckets" (23) made of rubber fixed on the external surface of the transport loop, which serve to lift the load from one level to another, being filled with granular material. This invention also proposes distributed motorization in this type of equipment, dispensing with the rotary motorization installed in the head drum. The situation of this equipment is quite similar to that of FIG. 1 with the difference that in the bucket elevator, the rubber belt (24) is flat and oriented vertically. In this conveyor, the central rollers (14) and the return drums (3) must also have grooves (11) or be bipartite to allow the passage of the secondary (2) plates (8, 12).

All the described equipment: horizontal rubber belt conveyor, metal feeder, and bucket elevator can operate with both types of secondary: overlapping plate (8) type and trapezoidal (12) plate type.

The invention was developed to simplify the operation and maintenance of conveyor belts since current equipment requires very high mechanical tensioning. Such tensions cause stretching in rubber, friction between moving parts, wear of bearing elements, and energy inefficiencies.

The proposed distributed linear drive increases the reliability and availability of the equipment since, in case of a failure in any of the motors, there is no need to stop the operation for maintenance, as the load can be redistributed to the other operating linear motor units.

The invention claimed is:

1. A conveyor for granular material and wherein operates in transporting granulated articles from mining or other sources, the conveyor comprising:
    a rubber or metallic belt (1);
    a linear induction electric motor to drive the rubber or metallic bell;
    the linear induction motor having an active double sided primary (5) with long and sectioned secondary (2) of overlapping plates (8) or trapezoidal plates (12) installed in a central and an internal portion of the conveyor (1) transport loop,
    a metal structure (16) supporting the rollers (14; 15 and 18), in turn, central load rollers (14) and side load rollers (15) support the belt (1); the belt (1) in turn follows its closed-loop path, looping around return drums (3) located at the ends of the conveyor;
    the conveyor having bipartite central load rollers (14) and return drums (3) with grooves (11) accommodating a passage of the secondary plates (8; 12) during a belt (1) path.

2. The conveyor according to claim 1, wherein the conveyor belt is sectioned with conductive plates (8, 12) made of aluminum, copper, or alloys.

3. The conveyor according to claim 1, wherein the conveyor operates through distributed motorization along a linear length.

4. The conveyor according to claim 1, wherein the long and sectioned secondary (2) is positioned vertically as a keel installed, removably with mechanical fasteners or permanently through of adhesives, welding or vulcanization, on an internal surface of a closed circuit formed by the conveyor.

5. The conveyor according to claim 1, wherein the conveyor includes a plurality of linear electric motors to dynamically distributing operating load between motor units.

6. The conveyor according to claim 1, further including linear induction motors to regenerate energy on sloped terrain or in moments of speed reduction with the loaded conveyor.

7. The conveyor according to claim 1, further including a plurality having of linear induction motor units with active braking capacity through the double-sided primary drive to guarantee a wide range of operation including keeping the treadmill stationary under load.

8. The conveyor according to claim 1, wherein the conveyor operates vertically.

9. The conveyor according to claim 1, further including a metal feeder having a belt made of metal plates and secondary plates fixed directly to the metal plate.

10. The conveyor according to claim 1, further including centralizing guide elements (6) on the secondary (2) in relation to the primary (5) gap, and also centralizing the belt (1) on a transport bed.

* * * * *